United States Patent Office 3,514,830
Patented June 2, 1970

3,514,830
METHOD FOR MANUFACTURING A COATING LAYER TO PROTECT THE WORKING SURFACES OF MACHINERY
Shinjiro Takakita, 1, 323 Kamihatsu-cho, and Ko Takakita, 3088–40 Sakuragaoka, both of Nabari-shi, Mie-ken, Japan
Filed Oct. 27, 1967, Ser. No. 678,561
Claims priority, application Japan, Oct. 29, 1966, 41/71,574
Int. Cl. B21h 7/00; B21k 19/00
U.S. Cl. 29—148.3                                6 Claims

ABSTRACT OF THE DISCLOSURE

A surface coating material for protecting the working surface, such as scrapers, ploughs of agricultural, or civil engineering machinery or the like from wear, is manufactured by first forming a shaped skeleton having a number of pores communicating with the exterior with a wear-resistant material into a desired shape in accordance with the intended use of said surface coating material, and then impregnating into the pores of the shaped skeleton a plastic material such as synthetic resins to avoid adherence of an object to be worked to the working surface of the machinery.

---

This invention is concerned with improvements in the surface coating material mainly to be fitted on the working surface of machinery for agricultural, civil engineering, or like purposes in order to improve its operating capability and efficiency.

It has already been disclosed in the copending application Ser. No. 670,909 filed Sept. 27, 1967 that in order to prevent adherence of the object to be worked such as mud, soil, etc. and of maintaining desirable operating capability of machinery, the working surface as well as the surrounding part thereof of the agricultural or civil engineering machinery are coated with a surface material formed with a plastic material such as synthetic resins, etc. on which the objects to be worked are difficult to be adhered.

It is also disclosed in the abovementioned copending application that, in order to reduce wear and tear of the surface coating material of this kind, it is formed in such a way that a metal material such as iron, steel, aluminum alloy, copper alloy, etc., or a non-metallic wear-resistant material such as ceramics, graphite, etc. are added to the plastic materials such as synthetic resins, etc. in an appropriately and optionally selected mixing proportion as well as quality of the material in accordance with the purpose of use of the surface coating material.

In the conventionally known surface coating material, various problems arise such that, due to a difference in the specific gravity between the plastic material and the wear-resistant material to be added thereto, the latter is prone to sediment in the mixture body of the surface coating material, which therefore lacks uniformity in distribution of these mixed materials with the consequence that, when the surface coating material is fitted on the working surface of the machinery, it occurs, not infrequently, that the part of the working surface where much wear-resistant property is required is short of distribution of such wear-resistant material; and that the wear-resistant material distributed in the surface coating material becomes gradually exposed outside following wear of the plastic material which is integrally connected therewith, and it finally peels off from the surface material, and so on.

It is therefore the primary object of the present invention to provide improved surface coating material capable of solving these problems.

It is also an object of this invention, in a more particular aspect, to provide a surface coating material for agricultural and civil engineering machinery consisting of a plastic material such as a synthetic resin, etc. which reduces adherence of the object to be worked, and a wear-resistant material for reducing wear of the surface coating material, wherein the plastic material and the wear-resistant material are mutually arranged in an alternately adjacent state and are simultaneously strongly bonded to each other.

According to the present invention, there is provided a method for manufacturing a surface coating material to be used for machinery of agricultural, civil engineering and like purposes which comprises forming with a wear-resistant material a shaped skeleton having a number of pores communicating with the exterior into a shape in accordance with the intended use of said surface coating material; and impregnating into said pores a plastic material consisting of synthetic resin to avoid adherence of an object to be worked to the working surface of the machinery.

The foregoing objects, and characteristic feature of the invention will become evident and will be more readily understood by the following description taken in conjunction with the accompanying drawing, in which.

Figure 1:
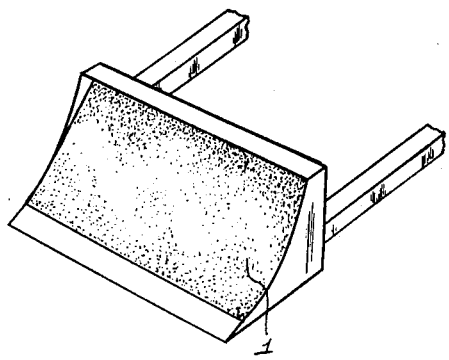
FIG. 1 is a perspective view of an earth-moving blade of a scraper or similar civil engineering machinery, on the surface of which is fitted the surface coating material according to the present invention.

FIGS. 3, 4, 5, 6, and 7 indicate fragmentary views in partly longitudinal section of various embodiments of the surface coating material according to the present invention.

The present invention characteristically forms a base or skeleton material with a wear-resistant material in such a manner that a number of pores are exposed on the surface of the base material, into which a plastic material such as a synthetic resin, etc. is filled.

The wear-resistant material forming the base or skeleton material of the surface coating material according to this invention can be any of the materials as already disclosed in the aforementioned copending application such as, for example, metal materials of iron, steel, aluminum, copper, molybdenum, or alloys thereof, or non-metallic material of ceramics, stones, graphite, etc. These materials are used singly or in an appropriate combination with a plastic material such as a synthetic resin, etc.

The pores to be provided on the base material consisting of the wear-resistant material are to be filled in with the plastic material such as a synthetic resin which is less adhesive and frictional against the object to be worked such as mud, soils, etc., and to hold it on the surface of the shaped skeleton at a definite proportion. It is essential that the plastic material be provided in an exposed state on the surface of the shaped skeleton, but its shape as well as its method of forming into a wire-rod, which is then woven or interlaced in the form of non-woven cloth, thereafter it is shaped into a desired shape, the intervals or gaps formed between the woven wear-resistant material in wire-rod shape being made the abovementioned pores; or, a porous shaped skeleton is formed with the wear-resistant property, the pores of which being utilized for filling the plastic material therein; or, when a shaped skeleton is formed, a number of perforations are made on the surface thereof; or any other appropriate expedient may be employed for this purpose.

The method of filling the pores formed in the shaped skeleton with plastic material such as synthetic resins can be effected by proper selection of heating, compression, pressure reduction, sedimentation, capillary action, vibration, impact, electrical movement, or the like. More specifically, the molten plastic material is poured into these pores, or forcibly filled in by pressure, or impregnated by immersing the shaped skeleton into the molten plastic material, or the shaped skeleton is heated and then the plastic material is subjected to contact-pressure thereto, or the like.

In this case, the wear-resistant material to be used for the shaped skeleton, or base material, having a number of pores and the plastic material such as synthetic resins and so forth which are filled in the abovementioned pores in the shaped skeleton with a view to reducing adhesive as well as frictional force with respect to the objects to be worked should be selected co-relatedly respectively so that they mutually promote their inherent function depending on the intended use of the machinery, the part of the machinery to be employed in working, as well as varities of the working objects. More specifically, for the surface coating material to be used for the cutting blade of the working machinery or other similar part to render the cutting action, the shaped skeleton as the base material is formed principally with a wear-resistant material having strong properties against wear and tear as well as impact, and the plastic materials to be filled in the pores in the base material is selected from among those materials which are strong against wear and impact as possible. Also, if the surface coating material is to be used for the guide portion in continuation of the cutting blade of the machinery, the shaped skeleton should be formed mainly with those materials which are light in weight and strong against wear, and the plastic material such as synthetic resin, etc. to be filled in the pores provided in the shaped skeleton should be one which is less adhesive of the object to be worked as well as of low friction resistance.

The improved surface coating material according to the present invention is essentially different from that disclosed in the aforementioned copending application, the one which is formed from mixture in arbitrary proportion of the wear-resistant material such as metal or non-metal and the plastic material such as synthetic resins, etc., in respect of the state of distribution of the wear-resistant material and the plastic material such as synthetic resin, etc. in the finished surface coating material and the manner of their being maintained with respect to the surface coating material. That is, since the present invention forms the surface coating material by retaining the plastic material such as synthetic resin, etc. in the pores of the shaped skeleton formed with the wear-resistant material, the state of distribution of the wear-resistant material in the finished surface coating material is maintained just as in the initial state of the shaped skeleton. Consequently, it is possible by variously changing the shape of the base material, or shaped skeleton, to retain the wear-resistant material in the finished surface coating material in any desired state of distribution. For the same reason, also, the plastic material such as synthetic resins, etc. can be kept in the finished surface coating material in any desired state of distribution. Further, the wear-resistant material is maintained in the finished surface coating material in an integrally connected mass as the shaped skeleton or base material, on account of which even if the surface of the coating material is gradually worn out after use and, particularly, part of the plastic material such as synthetic resins is worn out and the wear-resistant material remains in floatation state, it is rigidly held in the surface coating material without being peeled off or exfoliated as in the conventional surface coating material.

In order to more fully explain the present invention, explanations will be made with reference to a few preferred embodiments as in the following.

Figure 2:
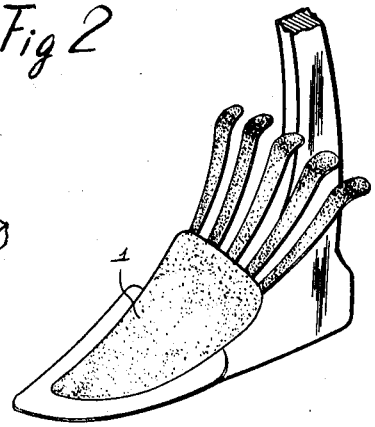
FIG. 2 is a perspective view of a plough, on the surface of which is fitted the surface coating material according to the present invention.

General views of the surface coating material according to the present invention provided on the working surface of the machinery for agricultural, civil engineering, and like purposes are shown in FIGS. 1 and 2.

FIGS. 3, 4, 5, 6, and 7 are, respectively, model pictures, partly in longitudinal section, of the surface coating material of various kinds to be manufactured in accordance with the present invention, for the purpose of explaining the manufacturing step of the surface coating material to be attached onto the working machinery for agricultural, civil engineering and like purposes.

Figure 3:
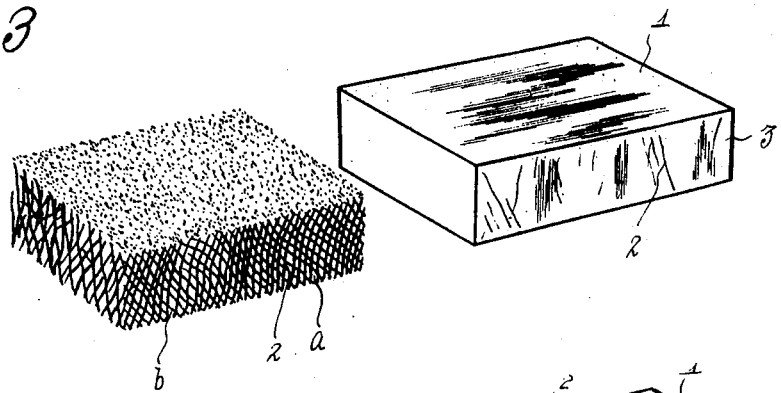

In FIG. 3, the surface coating material 1 consists of a wear-resistant material distributed in said material 1 and a plastic material such as synthetic resins distributed in the same manner as the wear-resistant material 2. According to this embodiment, the wear-resistant material 2 is thin steel wires, or thin wires of other metal or alloy, when is then shaped into a flat plate. Intervals or gaps formed among these steel wires constitute the pores a, in which the plastic material is to be filled. A molten plastic material 3 of synthetic resins is impregnated into the pores a of the thus shaped skeleton body to produce into an integral body of the surface coating material.

In this example, the wear-resistant material 2 and the plastic material 3 distributed in the surface coating material can be exposed on the surface of the surface coating material 1 in an extremely fine granular state by making the steel wires a to be used for the wear-resistant material as thin as possible, whereby both materials can also be distributed uniformly in an extremely dense state. Also, since the steel wires as the wear-resistant material 2 are continuous within the body of the surface coating material 1 in an mutually entangled state, they do not exfoliate even when the surface of the material 1 is gradually worn out. Furthermore, the plastic material 3 of synthetic resin is impregnated and filled in among the gaps (or pores a) created in the entangled steel wires, thus forming an integral body of the surface coating material. Consequently, the plastic material is also extremely rigidly held in the surface coating material 1 as in the case of the wear-resistant material 2. Moreover, as the shaped skeleton b as the base material of the surface coating material exhibits relatively flexible properties, it is capable of giving rigidity to the finished surface coating material.

Figure 4:
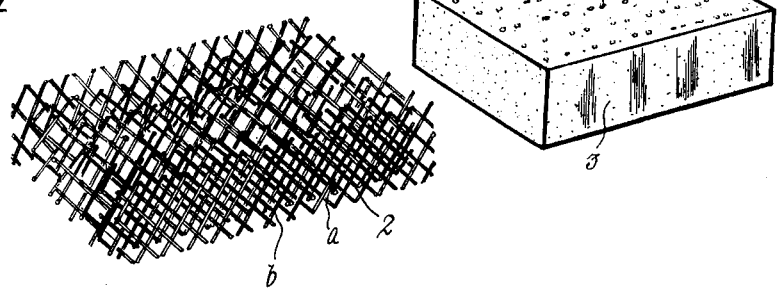

FIG. 4 shows another embodiment of the present invention, wherein steel wire having a thicker size than the abovementioned first embodiment (the rod material is not necessarily of steel, but any other metal or alloy may be used) is woven in the form of belt, which is turned sideways, and a plurality of such belts are laminated consecutively and pressed down to shape into a base material of a flat plate shape having thickness of the surface coating material to be used. The stitches of the steel wires, in this case, constitute the pores a, where a plastic material 3 consisting of synthetic resin is impregnated to produce the finished surface coating material. In this example, the resulting surface coating material is stronger in its rigidity than that of the first example. Also, the steel wires woven into a belt shape, as the wear-resistant material 2, are exposed to the surface of the material 1 at the portion of both side edges of the steel wires, so that distribution of the wear-resistant material can be maintained relatively regularly. Furthermore, according to the method of this example including that of FIG. 3 above, a remarkable advantage can be obtained such that filling of the plastic material 3 in the pores a of the shaped skeleton is accomplished under strong pressure in taking advantage of pressure exerted at the time of production of the shaped skeleton by addition of plastic material 3, when the wire-shaped wear-resistant material 2 is press-molded into a certain definite, procedure.

Figure 5:
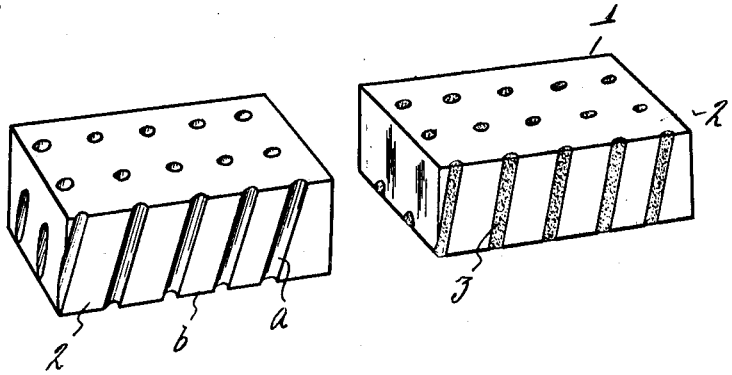

In the example shown in FIG. 5, the shaped skeleton forming base material is shaped into a form of a flat plate from beginning by use of steel, or other appropriate alloys. In this skeleton, a number of through-holes are provided at the time of molding, or after the molding, which constitute the pores a and into which the plastic material 3 consisting of synthetic resins is poured in so as to form the required surface coating material. In this embodiment, the shaped skeleton as the wear-resistant material 2 becomes the frame for the surface material 1, hence, an extremely strong and durable surface coating material can be obtained.

Figure 6:
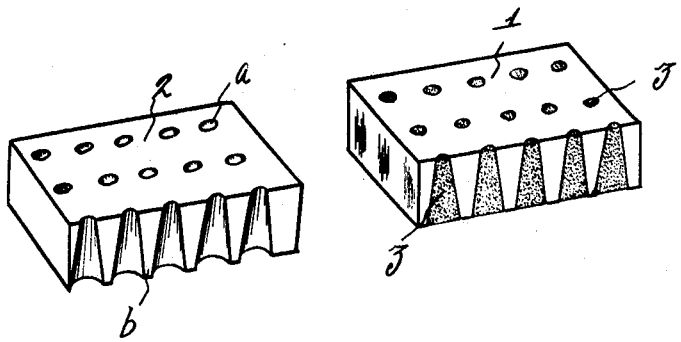

The surface material shown in FIG. 6 is a modification of the foregoing few examples, wherein the through-holes constituting the pores a have different diameters at their top surface and bottom surface, i.e., the hole becomes gradually tapered from the side where the surface material contacts the working surface of the machinery toward the front surface where it directly contacts the object to be worked. In this method, the through-holes can be formed when the shaped skeleton is shaped in a casting mold, or they can also be formed easily by press after shaping of the base material. The plastic material 3 consisting of synthetic resin can be easily filled in the pores under pressure.

Since the pores a in the examples shown in FIGS. 5 and 6 can be provided at any desired rate of density, any preferred state of distribution between the wear-resistant material 2 and the plastic material 3 can be realized.

Figure 7:
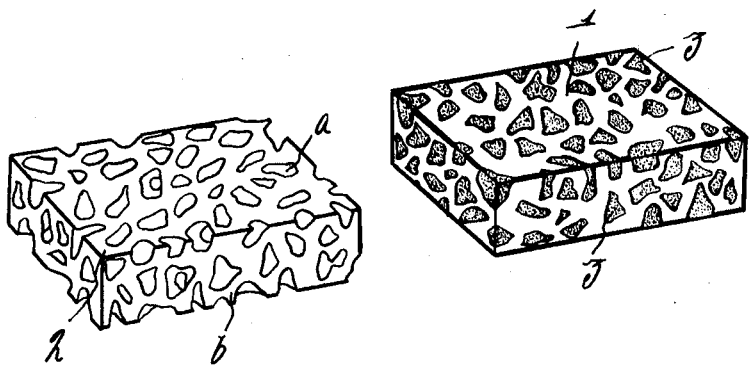

FIG. 7 shows further embodiment of the present invention, in which the shaped skeleton b, or the base material, of the surface coating material is formed in a porous structure of steel or other metal alloys and a plastic material 3 such as synthetic resins is impregnated in this porous structure. In this example, a slight difficulty is encountered in impregnation of the plastic material 3 into the pores a of the shaped skeleton b. However, much more advantage than this kind of difficulty can be entertained in that the shaped skeleon is lighter in weight than that of any of the shaped skeleton in the aforementioned examples and possesses sufficient durability against wear and tear as the base material.

It should also be noted that, in the examples of FIGS. 5 through 7, when the shaped skeleton b as the frame for the intended surface coating material having a certain definite hardness is shaped by a wear-resistant material 2, a plastic material such as synthetic resins, etc. is initially added, in some case, to the wear-resistant material 2 to be shaped into a desired shape.

As mentioned in the foregoing, the surface coating material of the present invention is manufactured by a wear-resistant material which is shaped into a base material, or shaped skeleton, having a number of pores therein, into which a plastic material such as synthetic resins is impregnated and filled, so that it is possible to render the wear-resistant material to be retained in the surface material and the plastic material consisting of synthetic resin in any desired state of distribution in the finished surface coating material and, moreover, to maintain the wear-resistant material rigid and strong.

Although the invention has been described with reference to some preferred embodiments thereof as shown in the drawing, it should, of course, be understood that all changes and modifications of the embodiment of the invention may be made within the spirit and scope of the invention as set forth in the appended claims.

We claim:

1. A method for manufacturing a coating layer to protect the working surfaces of machinery for agricultural and civil engineering purposes, which comprises the steps of: forming a solid body of a wear-resistant material which is shaped into a desired form; stamping a plurality of evenly distributed and similarly shaped through-hole in said solid body; and filling in said through-holes with a plastic material to reduce the adherence and friction between the working surfaces and the objects to be worked.

2. A method according to claim 1, wherein the wear-resistant material is a metal selected from the group consisting of iron, steel, aluminium, copper, molybdenum, and alloys thereof.

3. A method according to claim 1, wherein the wear-resistant material is a non-metal material selected from the group consisting of ceramics, stones, and graphite.

4. A method according to claim 1, in which the solid body has top and bottom surfaces and said through-holes are equal in diameter from the top surface to the bottom surface of the solid body.

5. A method according to claim 1, in which the solid body has top and bottom surfaces and said through-holes are tapered, the diameter at the top surface of the solid body being smaller than the diameter at the bottom surface thereof.

6. A method according to claim 1, wherein said plastic material is a synthetic resin.

References Cited

UNITED STATES PATENTS

| | | | |
|---|---|---|---|
| 1,742,515 | 1/1930 | Mandell | 264—43 |
| 1,842,186 | 1/1932 | McBerty | 264—43 |
| 1,978,620 | 10/1934 | Brewster | 264—128 X |
| 3,053,713 | 9/1962 | Juras | 29—419 X |
| 3,250,833 | 5/1966 | Wagner | 264—43 |
| 3,378,613 | 4/1968 | Hampshire | 264—41 |

CHARLIE T. MOON, Primary Examiner

D. C. REILEY, Assistant Examiner

U.S. Cl. X.R.

29—419, 163.5; 156—242, 281; 264—273